(12) United States Patent
Preston

(10) Patent No.: US 8,600,578 B1
(45) Date of Patent: Dec. 3, 2013

(54) AUTO THEFT PREVENTION

(76) Inventor: Roy Preston, San Mateo, CA (US)

(*) Notice: Subject to any disclaimer, the term of this patent is extended or adjusted under 35 U.S.C. 154(b) by 207 days.

(21) Appl. No.: 13/135,656

(22) Filed: Jul. 11, 2011

(51) Int. Cl.
| | |
|---|---|
| *G05D 1/00* | (2006.01) |
| *F02N 15/04* | (2006.01) |
| *B60T 7/16* | (2006.01) |
| *G07C 5/00* | (2006.01) |
| *B62D 1/28* | (2006.01) |

(52) U.S. Cl.
CPC . *G07C 5/008* (2013.01); *B62D 1/28* (2013.01); *F02N 15/04* (2013.01)
USPC ........................... 701/2; 180/167; 74/8

(58) Field of Classification Search
USPC .......... 701/2; 74/6, 7 A, 7 R, 7 C, 8; 180/167
See application file for complete search history.

(56) References Cited

U.S. PATENT DOCUMENTS

| | | | | |
|---|---|---|---|---|
| 4,369,666 | A * | 1/1983 | Kern ........................ | 74/7 R |
| 4,928,778 | A * | 5/1990 | Tin ........................... | 180/167 |
| 8,112,185 | B2 * | 2/2012 | Wu ........................... | 701/2 |
| 2005/0224034 | A1 * | 10/2005 | Janisch ..................... | 123/179.2 |

* cited by examiner

*Primary Examiner* — James Trammell
*Assistant Examiner* — Daniel L Greene
(74) *Attorney, Agent, or Firm* — Robert Samuel Smith

(57) ABSTRACT

A system for preventing unauthorized operation of an automobile and enabling an authorized operator to operate the auto comprising a transmitter system located with said operator enabling the operator to broadcast a start signal received by a receiver system mounted on the auto, The auto engine is coupled to a starter motor and starts in reaction to receipt of the start signal.

4 Claims, 2 Drawing Sheets

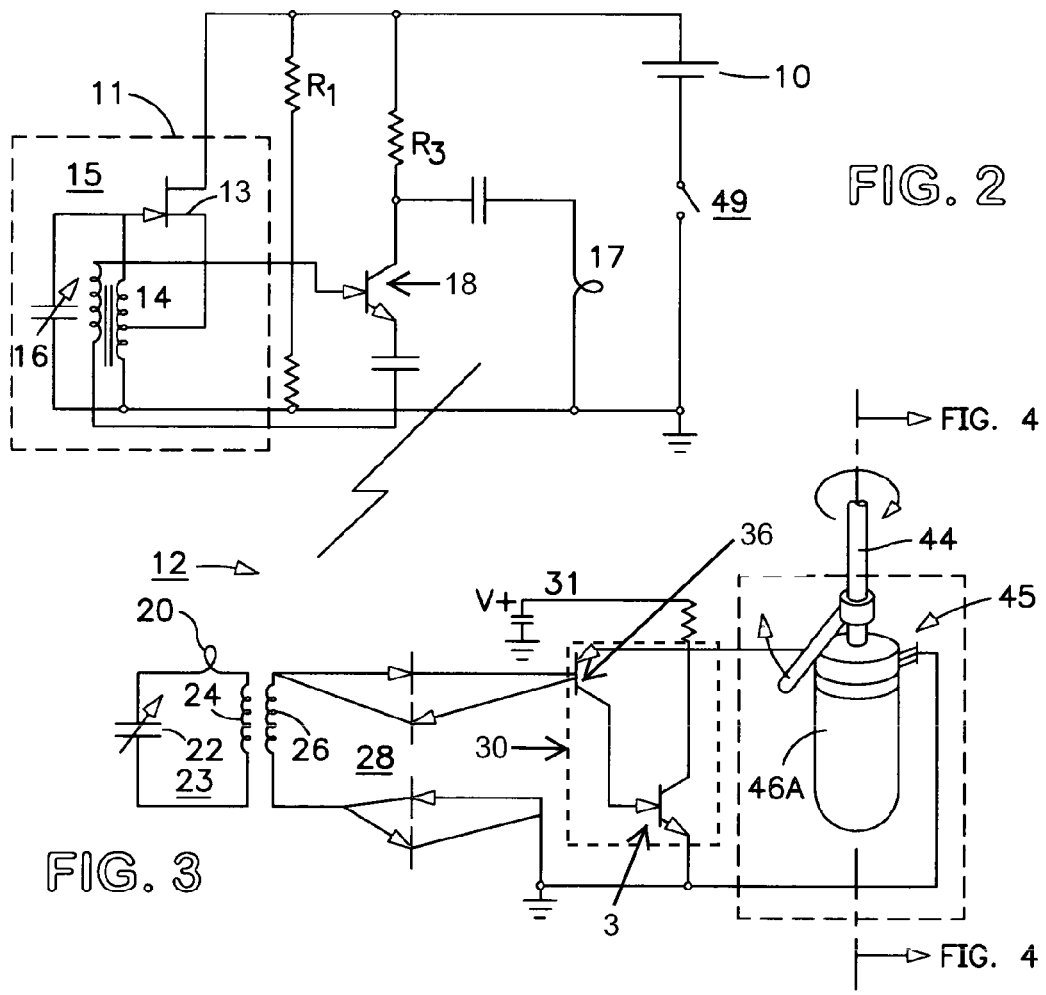
FIG. 2
FIG. 3
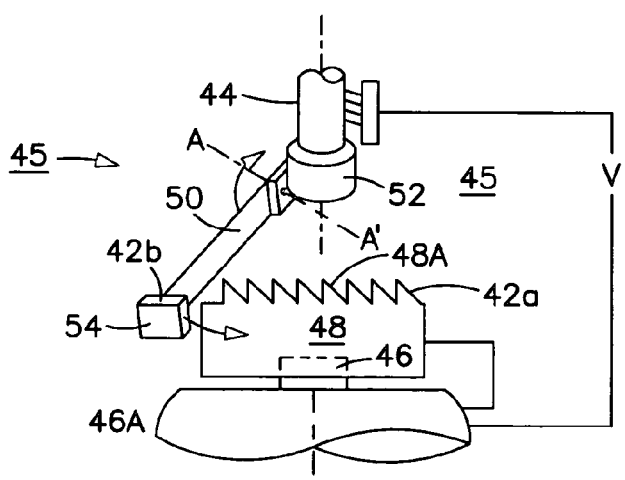
FIG. 4

AUTO THEFT PREVENTION

FIELD OF THE INVENTION

This invention relates to prevention of automobile theft and particularly to immobilizing the ignition system thereby preventing operation of the vehicle.

BACKGROUND AND INFORMATION DISCLOSURE

The electrical system found in the earlier automobile engines comprise a combination of two circuits for delivering a series of timed electric pulses to fire all of the engine cylinders during each revolution of the engine shaft.

The first circuit includes a battery, a condenser, the primary winding of a step-up transformer, and a contactor switch (points).

The second circuit includes the secondary winding of the step up transformer connected to a distributor switch. The distributor switch comprises a rotating contactor successively connecting the secondaary winding with each spark sparkplug during each revolution of the engine.

The contacter switch of the first circuit is coupled to the engine shaft to open a number of times equal to the number of cylinders during each rotation of the engine shaft Each time the first circuit is interrupted, the collapse of the magnetic field in the step-up transformer generates a strong pulse in the second circuit. Each strong pulse is applied by the rotating contactor of the distributor to one of the spark plugs.

In recent years, the contactor points have been replaced by the "electronic ignition module" (EIM).

The EIM comprises a generator coupled to the engine shaft that develops voltage pulses by any one of Hall effect, photo voltaic effect, and electromagnetic effect.

The timed pulses are amplified and delivered to the primary winding of the ignition coil.

The electrical circuits described above typically have a key operated "ignition switch" in series connection with the battery The ignition switch is intended to prevent unauthorized starting and operating the engine. However the ignition switch is notoriously ineffective to the thief who simply connects a jumper wire across the switch.

The typical automobile includes an electrically powered "starter" motor (battery operated) to bring the gasoline engine up to a speed where the gasoline engine becomes self powered. The starter motor has a starter solenoid. When the ignition switch is turned on (i.e. when the key is turned to start the car), a small electric current forces the starter solenoid to close a pair of heavy contacts, thus relaying a large electric current to the starter motor.

A number of references are presented in the prior art which feature remote control means intended to prevent unauthorized use of an automobile. However these devices are readily defeated by simply opening the hood of the engine and attaching jumper cables (hot wiring) around the device.

SUMMARY OF THE INVENTION

It is an object of this invention to provide a device and arrangement that prevents unauthorized use of an automobile. or operation of other devices such as door locks and safe locks.

It is contemplated that the anti theft device of this invention will prevent "hot wiring" and other attempts intended to defeat the typical key operated ignition switch.

The switch system of this invention comprises a transmitter section that broadcasts an "unlock" signal to a receiver section.

The transmitter section is preferably designed as a fob which is conveniently transported on the person of the operator.

In one scenario, the receiver section is connected between the automobile battery and the starter solenoid.

In another scenario, the receiver section is connected between the battery and the distributor.

In another embodiment, the switch is connected between the battery and an electronic ignition module of the automobile.

In these embodiments, a connection between a key component of the receiver section and the primary winding is made inaccessible to hot wiring so that unauthorized activation of the system is prevented.

In another embodiment, the transmitter section communicates with the receiver section by WiFi network.

The radio signal between the transmitter and receiver is typically a sine wave whose frequency is arbitrarily selected by the operator and may be changed by the operator as may be desired when it is suspected that the radio signal has been intercepted by unauthorized persons.

BRIEF DESCRIPTION OF THE DRAWINGS

FIG. 2 shows the transmitter system of the invention.
FIG. 3 shows the receiver system of the invention.
FIG. 4. shows another details of the one way clutch.

DISCUSSION OF THE DRAWINGS

Figure 1:
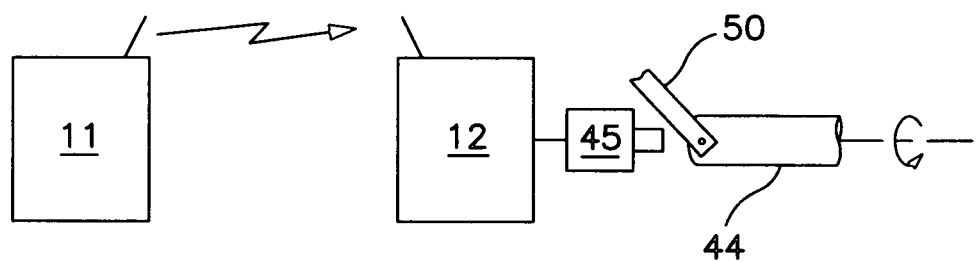
FIG. 1 shows sections of the invention.

Turning now to a discussion of the drawings, FIG. 1 is a schematic diagram of the major parts of this system for exercising remote control over starting an automobile. There is shown a remote transmitter section 11, that broadcasts a "start" signal to a receiver section 12. The receiver section responds to the start signal by applying power to, a one way clutch 45. The one way clutch 45 is temporarily coupled by lever 50 to drive shaft 44 of the automobile engine section 15. Lever 50 decouples from starter motor 45 until the auto engine turns over (is powered and the engine) "turns on"

In a preferred arrangement, the transmitter section 11 is configured as a watch fob, located with the operator.

FIG. 2 shows details of the transmitter section 11 including a battery 10 and an oscillator 15. In a preferred embodiment, the oscillator 15 is a Hartley type oscillator and has feedback transistor 13 and a center tapped inductance 14 coupled to a manually variable tuning condenser 16. The Hartley construction is preferred because the signal delivered from the center tap is uniform.

The wave signal from the oscillator 15 is amplified by transister 18 and delivered to loop (transmitter) antenna 17.

FIG. 3 shows the receiver section 12 which receives the radiated "start" signal broadcast from the antenna 17 of transmitter section 11 to the antenna 20 of the receiver section 12 when the operator closes switch 49.

FIG. 4 shows a "cog wheel" 48 mounted on a shaft 46 of a D.C. starter motor 46A (cutaway). A lever 50 has one end pivotally mounted on a collar 52 on engine shaft 44.

The output from the resonating circuit 23 of the receiver is output through the secondary winding 26 to a rectifier bridge 28. The rectified signal from the bridge 28 is delivered to a Darlington current amplifier 30. Darlington amplifier 30 comprises FET transistors 3, 36.

The rectified signal from rectifier 28 is delivered to a one way clutch 45. One way clutch 45 is shown to best advantage in FIG. 4.

One-way clutch 45 couples a shaft 44 of a main (automobile) engine to the shaft 46 of starter motor 46A when the engine and starter motor 46 are not turning.

FIG. 4 shows a "cog wheel" 48 mounted on a shaft 46 of a D.C starter motor 44 A (cutaway). A lever 50 has one end pivotally mounted on a collar 52 on engine shaft 44.

Figure 5:
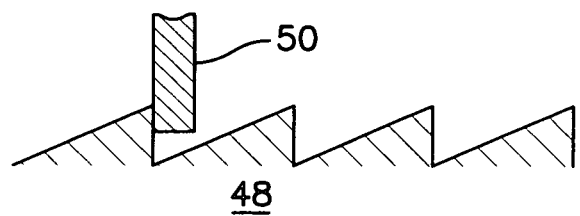
FIG. 5 is a cutaway drawing illustrating the lever-clutch interaction.

FIG. 5 is a cutaway view of the lever 50 contacting one of the cogs 48A of cup 48. The cog array has a "saw blade" construction so that lever 50 will engage one of the cogs when the cog array 48 is moving from right to left (shown in the FIG. 5) so that the starter delivers power to the engine shaft. Lever 50 can not engage any cog 48 when the cog array moves from left to right.

The starter motor is powered by the operator closing starter switch 49 (FIG. 1) When the starter motor is stationary or turning at low speed, the weight, 54, ensures that the "free" end of lever 42(b) will engage the closest one of "cogs" 48(a) by lever 50 pivoting about axis AA' When the engine shaft 44 is thereby engaged with the cog wheel 48, the automobile main engine shaft 44 is driven up to a speed by the starter motor 46A to where the engine spark plugs become operational. As the engine speed continues to increase, the centrifugal force generated by spinning lever 50 disengages the main engine shaft 44 from the cog wheel 48 (by rotation about axis AA')

At high rotational speed, the main engine shaft 44 is thereby decoupled from the starter motor shaft 46 and the engine continues to rotate at a higher and higher rate. The operator will release (desist pressing) starter switch 49 as the main engine shaft 44 continues to run rotate at high speed.

In summary, the main engine shaft is coupled to the starter motor shaft when the engine is idle and the starter motor is energized by the circuits of FIGS. 1 and 2 to "start" the engine.

The amplified direct current signal from the amplifier 30 is delivered to the starter motor that will turn over the main engine up to a speed where the engine "will start" and turn independent of the starter motor.

In use, the operator sets both variable condensers 16 and 22 to an arbitrarily chosen value so that the receiver resonator 23 is tuned to the transmitter resonator 15. The receiver antenna 20 is thereby enabled to receive the wave broadcast by the transmitter antenna 17.

The operator is thereby enabled to change the broadcast frequency of operation in order to prevent an unauthorized person (thief) from discovering the frequency of the signal wave and using his own transmitter to "unlock" the receiver section. with a transmitter operated by the thief.

There has been described a system and method for preventing operation of an automobile by unauthorized persons. The system includes a start signal generator in a transmitter system that is located with an authorized operator. The transmitter system broadcasts the start signal to a receiver system located on the automobile and coupled to the engine. The frequency of the start signal (to which both the transmitter and receiver are independently tuned, is known and selected by the operator as a protection against unauthorized starting of the automobile engine.

In view of various embodiments, and any modifications that may be contemplated as a result of reading the specification and studying the drawings, it is intended to define the scope of the invention by the appended claims.

What is claimed is:

1. A system for preventing unauthorized operation of an automobile with an automobile engine which comprises:
   a transmitter means locatable with an operator, for broadcasting a start signal from said transmitter means, initiated by said operator wherein said transmitter means comprises:
   a power supply (10) for providing direct current voltage;
   an oscillator circuit means (15) for generating a start signal when said oscillator circuit (15) is coupled to said power supply (10);
   a start switch connected between said oscillator circuit and said power supply wherein said oscillator generates said start signal when said start switch is closed;
   an antenna means (17), coupled to said oscillator means (15) arranged for broadcasting said start signal; and
   said system comprises: a receiver means, locatable with said automobile engine, for generating resonant energy when said receiver means receives said start signal wherein said receiving means comprises:
   a receiving antenna (20) arranged for receiving said start signal from said oscillator;
   a tank circuit means (23) coupled to said receiving antenna (20) and arranged for providing that said tank circuit means (23) generates a resonating signal in response to receiving said oscillator signal;
   a rectifier means (28) coupled to said tank circuit (23) for converting said resonating signal to a direct current (d.c.) starter signal;
   and said system comprises a clutch means (45) coupled to said rectifier means (28) for coupling said starter to a drive shaft of said engine when said drive shaft of said engine is turning below a critical rate and decoupling said starter motor from said drive shaft when a rotational rate of said drive shaft is greater than said critical rate.

2. The system of claim 1 wherein said transmitter means comprises:
   a power supply (10) for providing direct current voltage;
   an oscillator circuit means (15) for generating a start signal when said oscillator circuit (15) is coupled to said power supply (10);
   a start switch connected between said oscillator circuit and said power supply whereby said oscillator generates said start signal when said start switch is closed
   an antenna means (17) coupled to said oscillator means (15) arranged for broadcasting said start signal; and
   said receiving means comprises:
   a receiving antenna (20) arranged for receiving said start signal from said oscillator;
   a tank circuit means (23) coupled to said receiving antenna (20) and arranged for providing that said tank circuit means (23) generates a resonating signal in response to receiving said oscillator signal;
   a rectifier means (28) coupled to said tank circuit (23) for converting said resonating signal to a d.c. starter signal;
   a clutch means (45) coupled to said rectifier means (28) for coupling said starter motor to a drive shaft of said engine when said engine is turning below a critical rate and decoupling said starter motor from said drive shaft when a rotational rate of said drive shaft is greater than said critical rate.

3. The system of claim 2 wherein:
   said capacitor comprises a first variable capacitance;
   said tank circuit comprises a second variable capacitance;
   said first and second variable capacitances selected and arranged to provide that said operator is enabled to select and set variable capacitances at values where resonating frequency of said tank circuit matches a frequency of said oscillator providing that resonating energy in said tank circuit is generated when said start switch is closed thereby generating said starting motor when said drive shaft is turning below a selected rate.

4. The system of claim 2 wherein said clutch means (45) comprises:

- a cup gear mounted to rotate on the drive shaft of a d.c. starter motor;
- said cup gear having a circular rim;
- said cup gear mounted on a drive shaft of a starter motor to rotate about its centerline;
- said cup gear having an edge with an array of cogs formed on an edge of said cup gear;
- a lever having an end freely contacting any one of said cogs and an opposite end hingably attached to said engine shaft to rotate about an axis perpendicular to said engine shaft;
- said lever arranged to rotate out of contact with and edge of said cup gear when said engine shaft rotates at greater than a critical rotational speed;
- whereby said cup gear and lever comprise a switch in series circuit including the cup gear, the starter motor and rectifier of said receiver circuit providing that, when said engine shaft of said engine turns at less than a critical rate, said lever engages said cup gear and said starter motor is energized to drive said engine shaft and when said engine speed turns faster than a critical rate, said lever is disengages from said cup gear.

\* \* \* \* \*